United States Patent [19]

Akam et al.

[11] Patent Number: 5,065,858
[45] Date of Patent: Nov. 19, 1991

[54] GAS-FED TRANSFER TRACK

[75] Inventors: Nigel J. Akam, Largs; Donald M. Cameron, Gourock; David K. Halliday, Greenock; Raymond Paterson, Kirktonhill, all of Scotland

[73] Assignee: International Business Machines Corporation, Armonk, N.Y.

[21] Appl. No.: 481,019

[22] Filed: Feb. 16, 1990

[30] Foreign Application Priority Data

Feb. 16, 1989 [GB] United Kingdom ............. 8903562.0

[51] Int. Cl.⁵ .......................................... B65G 47/22
[52] U.S. Cl. .................................... 198/493; 406/86; 406/88; 406/192
[58] Field of Search ............... 198/493; 406/83, 86, 406/88, 94, 95, 109, 110, 150, 178, 192, 28, 31

[56] References Cited

U.S. PATENT DOCUMENTS

| 3,385,490 | 5/1968 | Malmgren et al. | 406/88 X |
|---|---|---|---|
| 3,747,922 | 7/1973 | Groeber | 406/88 X |
| 4,165,132 | 8/1979 | Hassen et al. | 406/10 |
| 4,275,976 | 6/1981 | Sticht | 406/31 X |
| 4,451,182 | 5/1984 | Lenhart | 406/86 |
| 4,823,929 | 4/1989 | Fleming et al. | 198/493 X |

FOREIGN PATENT DOCUMENTS

| 0054899 | 6/1982 | European Pat. Off. | |
|---|---|---|---|
| 1092384 | 11/1960 | Fed. Rep. of Germany | 406/192 |
| 2337370 | 2/1975 | Fed. Rep. of Germany | 406/192 |
| 0058738 | 4/1984 | Japan | 198/493 |
| 0280129 | 12/1987 | Japan | 198/493 |
| 0593987 | 2/1978 | U.S.S.R. | 406/86 |
| 0596519 | 3/1978 | U.S.S.R. | 406/88 |
| 1195596 | 6/1970 | United Kingdom | |
| 1288686 | 9/1972 | United Kingdom | |
| 13216334 | 8/1973 | United Kingdom | |
| 1353741 | 5/1974 | United Kingdom | |
| 1480455 | 7/1977 | United Kingdom | |
| 1565994 | 4/1980 | United Kingdom | |
| 1594791 | 8/1981 | United Kingdom | |
| 2192848 | 1/1988 | United Kingdom | |

OTHER PUBLICATIONS

Device Air Transport System, Gagne & Urban, IBM Technical Disclosure Bulletin, vol. 21, No. 1, 6/1978.
Self-Centering Air Lift Transport, Apgar & Ku, IBM Technical Disclosure Bulletin, vol. 18, No. 7, 12/1975.

Primary Examiner—Robert P. Olszewski
Assistant Examiner—James R. Bidwell
Attorney, Agent, or Firm—Laurence R. Letson

[57] ABSTRACT

A gas feed apparatus is described for the transport of articles between assembly line stations. A turbulent gas flow is generated which provides a balanced driving force for, in particular, lightweight, irregularly shaped articles, and thus reduces the incidence of inconsistent feeding and jamming. Incorporated into the apparatus are features for controlling both the number and the speed and stability of articles fed at any one time from the line to a station. In this way rapid and efficient transfer of articles between stations is ensured.

9 Claims, 1 Drawing Sheet

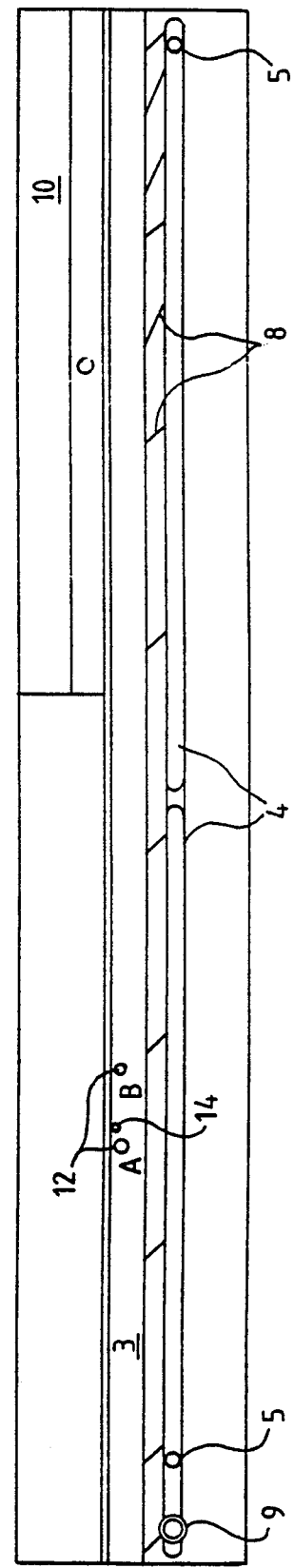
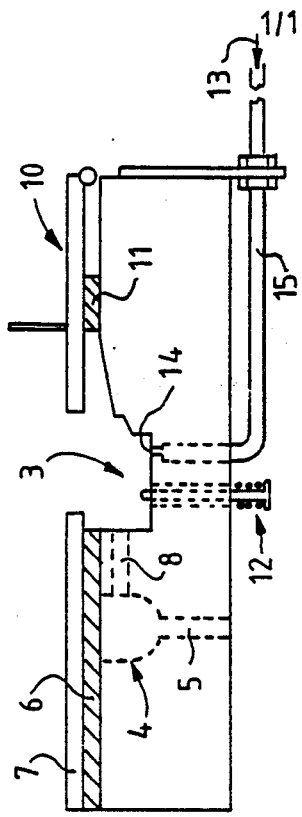
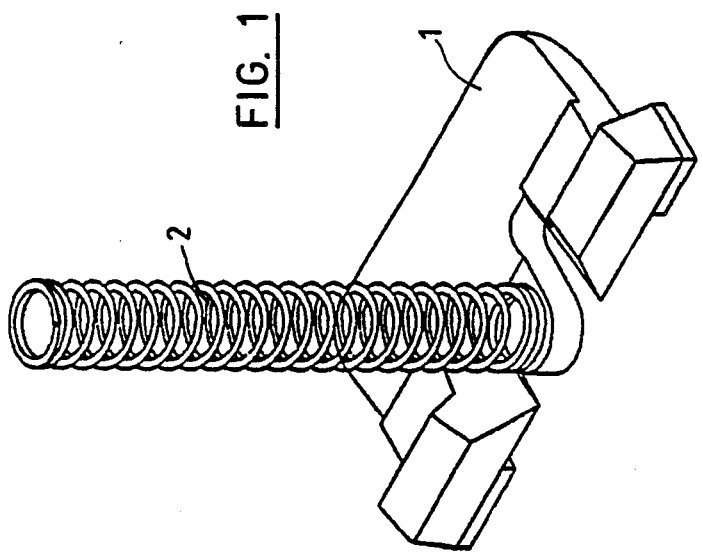

GAS-FED TRANSFER TRACK

This invention relates to a gas-feed transfer track for transporting articles along an assembly line.

Assembly lines have been devised to transfer articles efficiently from one location to another as, for example, from an assembly station to a test site. Several types of transport apparatus have been employed, including vibratory tracks and "push-feed" mechanisms. Difficulties arise when using either of these techniques, particularly for the transport of lightweight, irregularly shaped parts, in that as well as being slow, inconsistent feeding and jamming of the article frequently occurs. Gas-feed transport mechanisms suffer from similar problems and generally also require a high operating gas pressure.

An object of the present invention is to provide a gas-feed transfer track capable of transporting lightweight, irregularly shaped items from one location to another, both rapidly and with reduced risk of holdups due to jamming and inconsistent feeding of the article. It also differs from previously used gas-feed mechanisms in that, by incorporating several features within the body of the track along which the articles are transported, excessive gas loss is prevented and thus the system can be maintained at a relatively low working gas pressure.

According to one aspect of the invention as claimed, a gas-feed transfer track is provided for transferring articles from a first to a second location comprising a channel-shaped section along which said articles travel, means for supplying gas to the surface of said channel in such a direction as to propel articles from the first to the second location and means for generating turbulence at least at said first location to cause suspension of said articles.

By way of example, a specific embodiment of the invention will now be described in relation to the transport of keyboard pivot plate/spring subassemblies using an air flow. It would be clear to one skilled in the art, however, that employing the principles described, it would be possible to transport a wide variety of articles using many different gases.

The invention will now be described, by way of example, with reference to the accompanying drawings in which:

FIG. 1 shows a keyboard pivot plate/spring subassembly;

FIG. 2 illustrates a plan view of an assembly line incorporating the main features of the invention; and FIG. 3 is an enlarged end view of the same assembly line illustrated in FIG. 2.

The keyboard pivot plate shown in FIG. 1 has a plastic pivot plate 1 having a "three point contact" profile and carries a metal spring 2. This, together with the low mass of the part, can cause inconsistent feeding and jamming. This is a particular problem if the part is vibrated or "push-fed", but even occurs when jets of gas are used for its propulsion. In order to transport such an irregularly shaped article effectively, especially from a relatively static position, a more balanced driving force is necessary.

The gas feed track shown in FIG. 2, has a channel-shaped section 3 for supplying parts from an assembly station (not shown) at the right hand side, to a test station (not shown) at the left hand side, and incorporates two separate air-feed slots or manifolds 4. The use of more than one manifold has been found to result in improved efficiency by allowing greater control of the air pressure. Each air manifold 4 is associated with an air supply inlet 5 and regulator, the slots being sealed overall by a gasket 6 and track cover 7 as shown in FIG. 3.

Air is transferred from the manifolds 4 to the track through angled air outlet slots 8, generally angled to impart leftward motion. To start the part moving from a relatively static position at the assembly station end and to reduce the "turning effect" of air jets at a specific angle, some slots are cut at different angles, for example at both 30 and 45 degrees. The resulting turbulence leads to a more balanced driving force. An additional airfeed adjuster 9 is fitted to specifically control the air outlet slot next to the test station, which further controls the speed and stability of the part as it enters the test station.

As can be seen in FIGS. 2 and 3, an access flap 10 is incorporated into the design at the assembly station end, to allow access to the edges of the track and for the removal of the occasional trapped and/or damaged part. The flap is friction hinged and rests on a sealing gasket 11.

In order to control the number of parts going into the test station at any time, individual parts are fed via two spring loaded stop pins 12, of differing size. FIGS. 2 and 3, show these pins, the larger being at site A, nearer to the test end of the assembly line. Initially the larger stop pin A, is activated in passing along the track. The smaller stop pin, in position B, is retracted below the track lower surface. The part is sensed by means of a photoelectric sensor 13 mounted into the track lower surface and coupled to a sense hole 14 via a light pipe 15. Tests have shown a reflective sensor to be of use both in that it has a very small sensing surface enabling it to be mounted close to the stop pin, and in that it is very stable in varying ambient light conditions. The use of a reflective type sensor removes the need for a sensor probe to be mounted above the track, thus allowing clearer operator access.

In operation, when the sensor detects a part against stop pin A, and provided the controller indicates that the test station is empty, pin A is fired down and pin B up. Pin B is narrower than A and can pass between two pivot plate assemblies. The assembly to the left of B is free to pass into the test station where it is sensed by a similar detector to that already described. When sensed, stop pins A and B are reversed, the next part moves up to pin A and the process is repeated.

The apparatus described provides a rapid and efficient means of transporting articles and is of particular value for transferring lightweight and/or irregularly shaped articles (workpieces) between assembly line stations.

We claim:

1. A gas feed transfer track for transferring articles from a first to a second location comprising:
   a channel-shaped section along which said articles travel;
   means for supplying a gas flow along the surface of said channel-shaped section in such a direction as to propel articles from the first to the second location; and
   characterized by at least two gas outlet slots positioned to interact in said channel-shaped section for generating turbulence at least at said first location to cause suspension of said articles;

means for controlling the number of articles supplied to said second location at any one time, said means for controlling comprising two stop pins situated in the vicinity of the second location, the movement of which are synchronized such that when one protrudes from the surface of said channel, the other is retracted, and detection means for sensing the presence of an article at the stop pin nearer said second location to cause said nearer pin to retract and said pin farther from said second location to protrude.

2. A track as claimed in claim 1, further including means operable when an article is at said second location to reverse the positions of the stop pins.

3. A track as claimed in claim 2, where the stop pin (B) nearer to the first location is sufficiently narrow as to fit between articles transported seriatum along said track.

4. A track as claimed in claim 1, in which said detection means is a photoelectric sensor (13).

5. A track as claimed in claim 2, in which said detection means is a photoelectric sensor (13).

6. A track as claimed in claim 3, in which said detection means is a photoelectric sensor (13).

7. A track as claimed in claim 6, in which said slots for generating turbulence are gas outlet slots (8) orientated at various angles to the desired direction of transport of the articles and wherein the gas employed is air and the gas supply means includes one or more gas feed manifolds (4), each with a gas supply inlet and regulator and including a gas flow adjuster (9) fitted to the manifold (4) nearest to the second location, for controlling the speed and stability of the article on arrival at that location and including a friction hinged flap (10) for gaining access to the channel-shaped section.

8. A track as claimed in claim 7 wherein said article to be transported is a keyboard pivot plate/spring subassembly.

9. A track is claimed in claim 1 wherein said article to be transported is a keyboard pivot plate/spring subassembly.

* * * * *